United States Patent [19]

Coppa

[11] 4,426,791
[45] Jan. 24, 1984

[54] PROCESS AND SYSTEM FOR DRYING PRODUCTS AND MATERIALS, SUCH AS WOOD

[76] Inventor: Ivo Coppa, Via Toniolo, 20030 Seveso (Milan), Italy

[21] Appl. No.: 232,712

[22] Filed: Feb. 9, 1981

[30] Foreign Application Priority Data

Sep. 5, 1980 [IT] Italy ............................ 24481 A/80

[51] Int. Cl.³ .......................... F26B 3/04; F26B 21/08
[52] U.S. Cl. ........................................... 34/27; 34/29; 34/46; 34/50; 34/77; 34/54
[58] Field of Search .................... 34/46, 48, 77, 50, 54; 261/94; 62/228 D, 27, 29, 32, 34

[56] References Cited

U.S. PATENT DOCUMENTS

| | | | |
|---|---|---|---|
| 2,244,890 | 6/1941 | McGrath | 62/228 D |
| 2,405,593 | 8/1946 | Melvill | 261/94 |
| 3,468,036 | 9/1969 | Blaettler | 34/50 |
| 3,940,860 | 3/1976 | Unterreiner | 34/46 |
| 4,196,526 | 4/1980 | Berti | 34/77 |
| 4,205,456 | 6/1980 | Ayers et al. | 34/77 |
| 4,250,629 | 2/1981 | Lewis | 34/46 |
| 4,257,169 | 3/1981 | Pierce | 34/46 |

FOREIGN PATENT DOCUMENTS

| | | |
|---|---|---|
| 2902369 | 8/1980 | Fed. Rep. of Germany . |
| 2239918 | 2/1975 | France . |
| 2408802 | 6/1979 | France . |
| 2439958 | 5/1980 | France . |
| 570595 | 12/1975 | Switzerland . |

*Primary Examiner*—Larry I. Schwartz
*Attorney, Agent, or Firm*—Lane, Aitken & Kananen

[57] ABSTRACT

This invention relates to a system exploiting the thermal energy of the atmosphere for the drying of wood or any other product or material, the humidity content of which has to be reduced to the humidity percentage normally required for the use of the product or material.

2 Claims, 4 Drawing Figures

PROCESS AND SYSTEM FOR DRYING PRODUCTS AND MATERIALS, SUCH AS WOOD

This invention relates to a process and heat pump system for the drying of wood or other materials which need to undergo heating processes with or without humidification or dehumidification depending on the type of material to be dried.

The present technique has a well known importance in the drying and seasoning field, but hitherto the systems providing heating with or without the humidification of the air in the drying chamber by a heat pump cycle needed a maximum air temperature of 32° C. using the heat pump only, and 45°–50° C. when using Freon 22 gas with a system of additional electric resistances.

The object of the present invention is to use a system which employs a heat pump mechanism for a much wider temperature range, for example from 0° to 70° C., without using additional heating systems and also without subjecting the compressor to stress.

At present, in drying systems of the prior art, two evaporators are used in the heat pump cycle. These evaporators are connected in parallel and mutually shut off. Thus, the air coming from the chamber may follow in two alternative directions, with a resulting increase in the overall size of the system.

In this invention the object has been accomplished by using a heat pump cycle formed of only one evaporator and only one condenser through which at least part of the air flow passes, the flow rate of which is controlled as a function of the temperature of the air outcoming from the evaporator.

The embodiment of such an apparatus will be hereinafter explained with the help of the accompanying drawings, in which.

Such an apparatus enables four types of operations depending on the various drying requirements and conditions of outside air.

Figure 1:
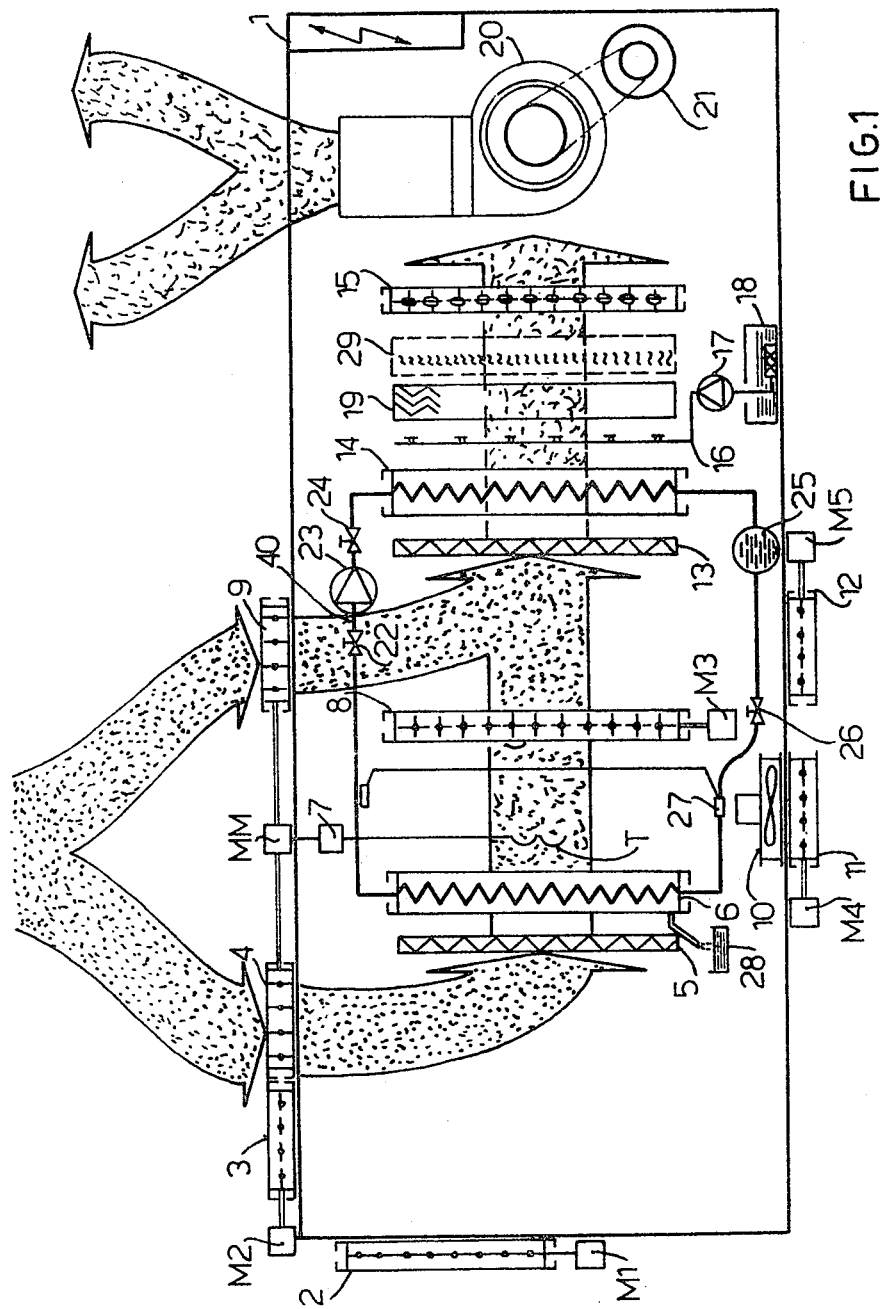
FIG. 1 is the operating diagram for the apparatus according to the heating and dehumidification operations.

The first operation (operation 1) provides dehumidification by using the compressor, and is shown in FIG. 1.

According to this operation:

1 (a) gates 2, 3, 11 and 12 are closed;
1 (b) gate 8 is open;
1 (c) fan or ventilator 10 is not operating;
1 (d) pump 17 for humidification is not operating;
1 (e) compressor 23 is operating under the control of the humidistat;
1 (f) heating battery 15 or 29 may be operating under control of an ambient thermostat.

In this invention a gate is a device which can be opened or closed through movable fans.

The air drawn from the chamber is made to pass through the gates 4 and 9, which will be more or less open, modulated by motor MM according to the measure taken by thermostat 7, which measures the temperature of the air coming from evaporator 6 by means of sensitive bulb T. Such a thermostat 7 is calibrated according to a value of 15° C. Should the air entering into the evaporator 6 be of a low temperature, for example 20° C. with 70% R.H. (relative humidity), the sensitive bulb T will measure a low temperature of the air, and accordingly will control the motor MM through said thermostat 7 to increase the opening of gate 4 and closing of gate 9 to allow the passage of a larger amount of air through said evaporator 6.

Should the air entering evaporator 6 be of a high temperature, for example 60° C. with 30% R.H., then the sensitive bulb T will measure a high temperature from the air coming from the evaporator. This means that the dehumidification process is not satisfactory (low degree of dehumidification). Said sensitive bulb T will control said motor MM to open said gate 9 and increase the closing of gate 4, providing at the outlet of said evaporator 6 air at a temperature of 15° C. (value set on thermostat 7) allowing as high a degree of dehumidification as possible under these conditions.

When said gates 4 and 9 are more or less open (that is the degree of relative humidity is of ordinary value, but should be lowered) the air coming from the gate 4 passes through the filter 5 and gate 8, which is open, and mixes with the air from said gate 9.

The air mixture therefore passes through the compressor 23 taking up the heat thereof and, through the filter 13 and condenser 14 which transfers to said air flow the heat taken from the evaporator 6.

Air can also pass through the electric heating battery 15, or through the hot water or steam batteries incorporated in the system, which devices can increase the temperature, if requested by an ambient thermostat (not shown).

Thus, the continuously operating fan 20 delivers treated air into the drying space or chamber.

Figure 2:
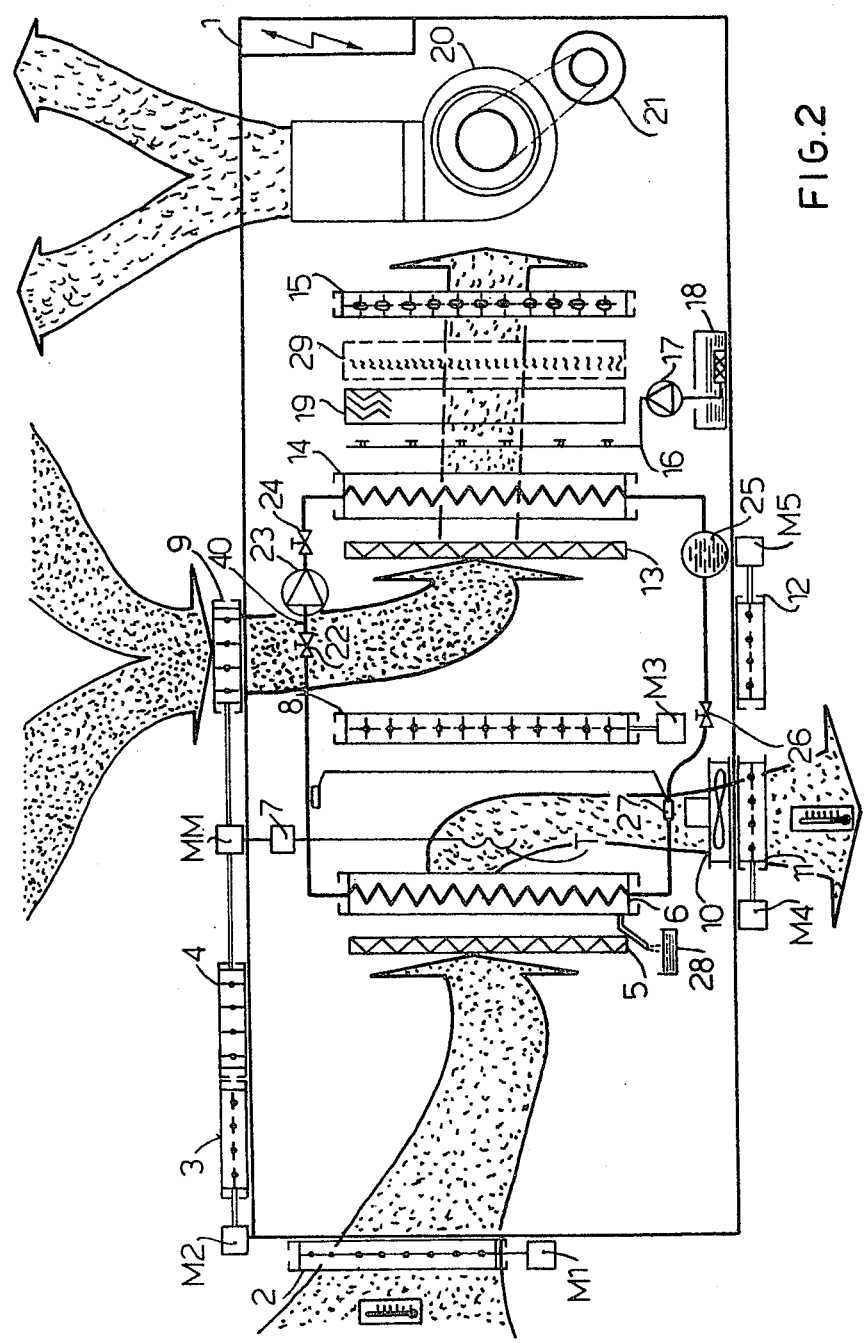
FIG. 2 is the operating diagram for the apparatus according to the simple heating operation.

A second operation (operation 2), which can be performed by this apparatus, provides heating only by using the heat pump cycle and is shown in FIG. 2.

According to this operation:

2 (a) gates 3, 4, 8 and 12 are closed;
2 (b) gates 2, 9 and 11 are completely open;
2 (c) fan 10 is operating only when compressor 23 is operating;
2 (d) pump 17 for humidification is not operating;
2 (e) compressor 23 is operating under control of an ambient thermostat (not shown);
2 (f) fan 20 is continuously operating; and
2 (g) heating battery 15 or 29 may be operating under control of ambient thermostat if external conditions do not permit the usual heating with the heat pump cycle system.

All of the air drawn from the drying chamber is made to pass through gate 9 and filter 13, is heated by taking heat from said condenser 14 and is then reintroduced into the drying chamber by fan 20. The heat received by said air flow derives in part from compressor 23 and in part from said condenser 14, which transfers the heat taken from outside air by evaporator 6 through the refrigerant fluid pumped by compressor 23.

This evaporator 6 receives heat from the outside air which is sucked through gate 2 and ejected through gate 11 by fan 10. It may occur that, owing to the too low outside air temperature, the evaporation pressure drops below a limit threshold value of the machine operation. In this case, the low pressure switch, not shown in the figure, is operated, the detecting element of which is connected to the aspiration pipe 40, which stops compressor 23 from operating. In this case, the electric heating battery 15 or water or steam heating battery 29 is automatically turned on; this battery performs the task of heating the drying chamber until external conditions permit the usual heating with the heat pump cycle system. Said compressor 23 will be restarted, while the heating battery 15 or 29 will be turned off.

Figure 3:
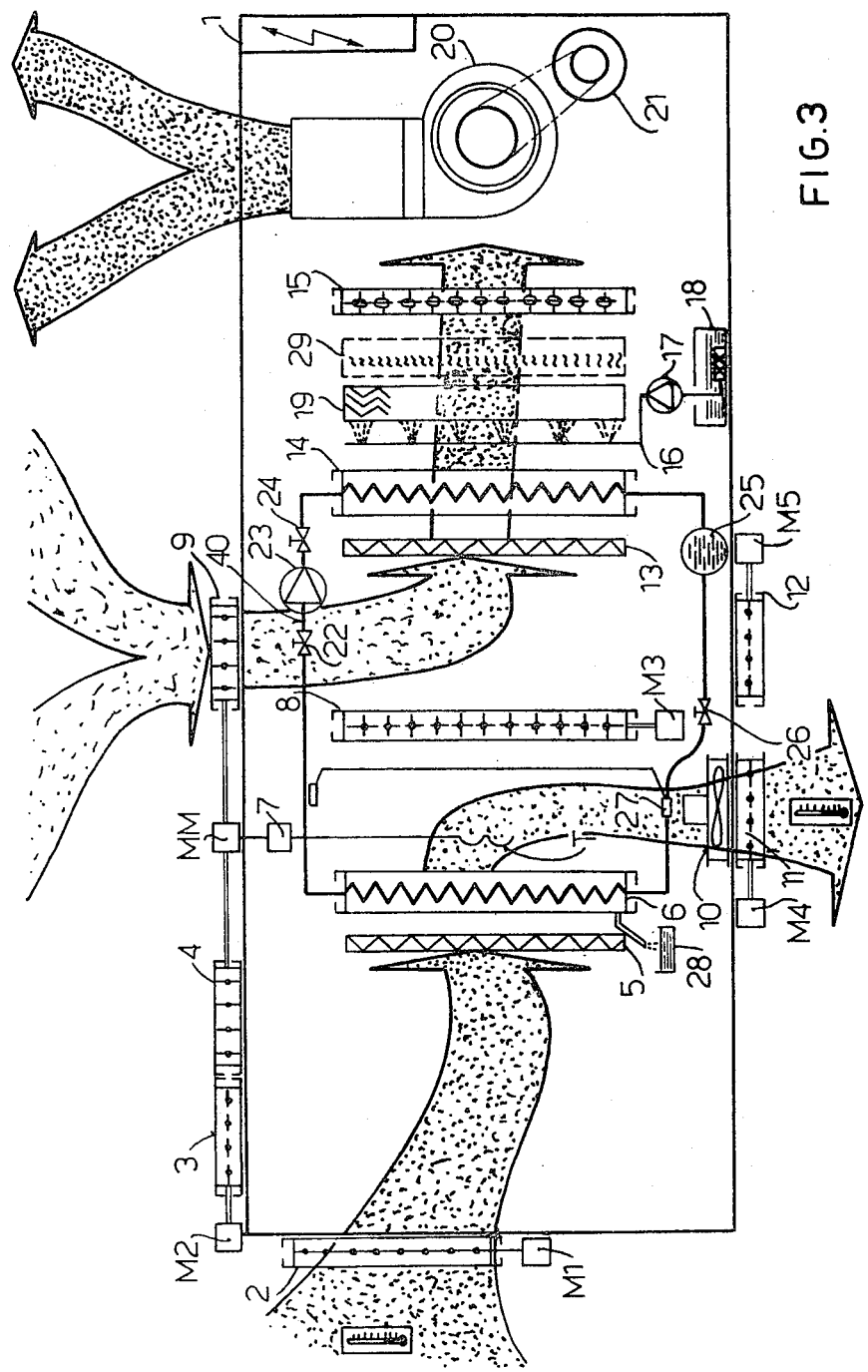
FIG. 3 is the operating diagram for the heating operation with humidification.

A third operation (operation 3), which can be performed by this apparatus, provides heating together with humidification, and is still shown in FIG. 3.

Thus, this operation is carried out as a heating operation only (operation 2), with a variation concerning the operation of the pump 17 for humidification which controls a nozzle device 16 which sprays water to dampen the hot air coming from the chamber. Said water is sprayed on a drop separator and is collected in a collecting basin 18, in which said water is heated.

Figure 4:
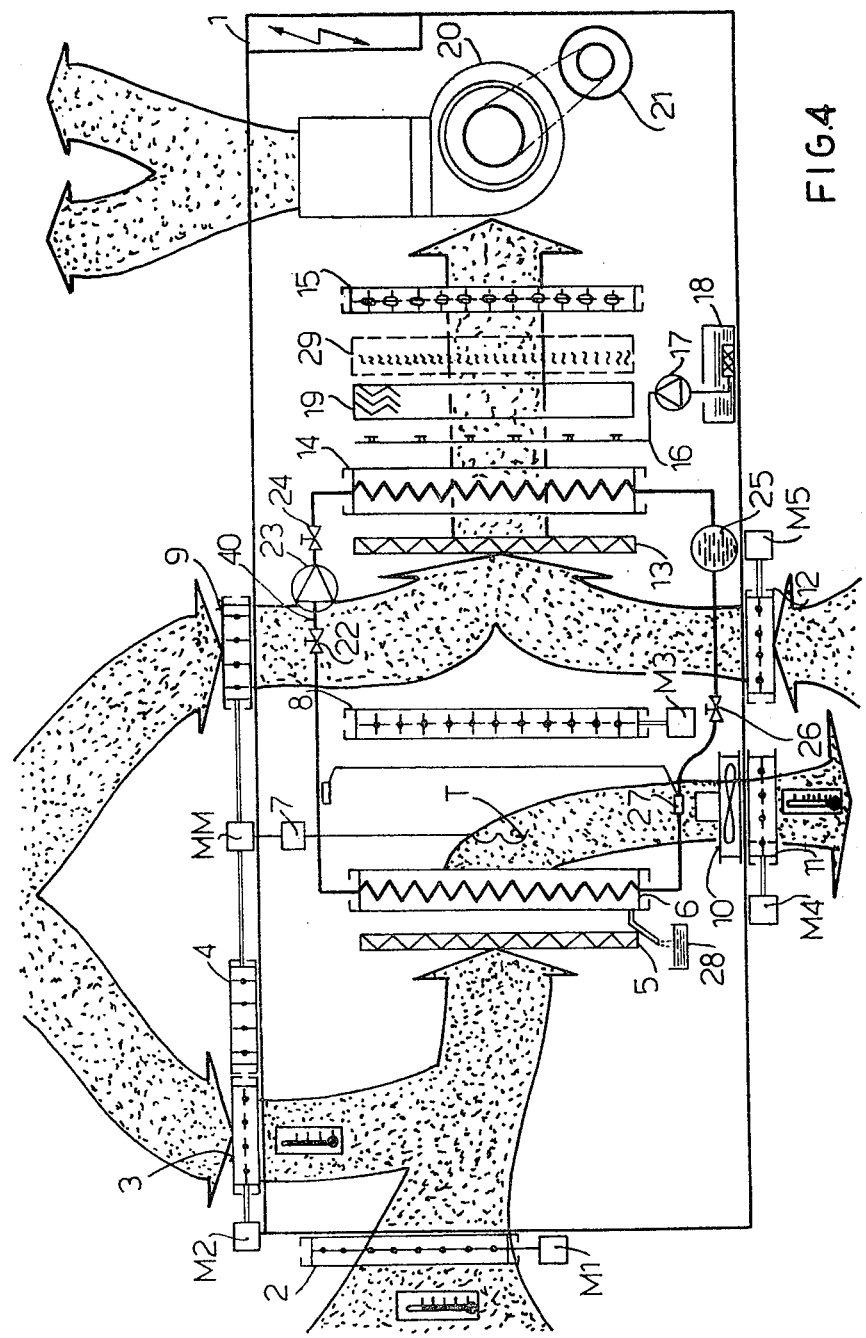
FIG. 4 is the operating diagram with the flows of warm and cold air and the apparatus according to the present invention for the dehumidification operation with the use of a compressor.

A fourth operation (operation 4), which can be performed by this apparatus, provides heating along with an ejection of damp air from the chamber and from which, after it has mixed with the air outside, heat is subtracted. Said operation is to be used for drying very damp woods, or in any case to quickly reduce the relative humidity of the chamber air. Such an operation is shown in FIG. 4 and according to this operation:

3 (a) gates 4 and 8 are closed;
3 (b) gates 2 and 11 are open;
3 (c) fan 10 is operating only when compressor 23 is operating;
3 (d) compressor 23 is operating under the control of an ambient thermostat;
3 (e) pump 17 for humidification is not operating; and
3 (f) fan 20 is continuously operating.

A humidistat (not shown in the figure) controls the opening or closing of gates 3 and 12. Should the relative ambient humidity exceed the adjustment value of the humidistat, the gates 3 and 12 are opened.

When the relative ambient humidity drops to the adjustment value of the humidistat, said gates 3 and 12 close, so that only ventilation and heating are provided, if required. Thus, the air sucked in from the chamber will pass only through the gate 9 and filter 13, and will then be heated by the condenser 14 through the heat pump cycle heating system or by the supplementary heating battery 15 or 29. It will be then supplied back to the ambient by fan 20, which is continuously operating.

If required to perform the heating and damp air ejection step with heat recovery, the gates 3, 9 and 12 are opened and the air sucked from the chamber passes in part through gate 3 and in part through gate 9. The amount of air from gate 9 mixes with that from gate 12, and the mixture passing through filter 13 is heated by compressor 23 and condenser 14.

The heat received by the mixture for heating is taken by evaporator 6 from the outside air and air from the chamber.

The mixture is then supplied to the ambient by fan 20, which is continuously operating. The amount of air coming from gate 3 mixes with the air from gate 2. The mixture then passes through filter 5 and evaporator 6, and is ejected to the outside by fan 10 through gate 11. Also in this case it may occur that, owing to the outside air temperature, the evaporation pressure will drop below a threshold value, thus stimulating the operation of low pressure switch through the detecting element connected to aspiration pipe 40, which stops compressor 23. The electric heating battery 15 or the warm water or steam batteries 29 will be automatically put into operation. They will heat the drying chamber until external conditions permit the usual heating with the heat pump cycle system. In this case the pressure inside the evaporator will increase. Upon exceeding the pressure threshold value, the compressor 23 will be automatically restarted and the batteries will be cut off.

What I claim is:

1. A process for the drying of wood and other materials using a heat pump cycle including a compressor, an evaporator and a condenser, comprising:
   placing the material in a chamber;
   selectively withdrawing air from the chamber, from the outside, or from both the chamber and the outside,
   passing the air through the evaporator to remove heat from the air;
   selectively returning the air to the chamber or discharging the air to the outside, depending on the properties of the air after it has passed through the evaporator;
   passing the air to be returned to the chamber through the condenser prior to returning the air to the chamber;
   withdrawing additional air from the chamber;
   passing the additional air directly through the condenser;
   controlling the ratio of air passed through the evaporator to additional air passed directly through the condenser in response to the properties of the air passed through the evaporator after it has passed through the evaporator; and
   mixing the air withdrawn from the outside with the air withdrawn from the chamber, before the air from the chamber is passed through the evaporator.

2. The process according to claim 1, further comprising:
   passing the air to be returned to the chamber over the compressor.

* * * * *